(12) United States Patent
Manczak et al.

(10) Patent No.: US 7,979,869 B2
(45) Date of Patent: Jul. 12, 2011

(54) METHOD AND SYSTEM FOR PERFORMING I/O OPERATIONS USING A HYPERVISOR

(75) Inventors: Olaf Manczak, Hayward, CA (US); Christopher A. Vick, San Jose, CA (US); Michael H. Paleczny, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 923 days.

(21) Appl. No.: 11/932,825

(22) Filed: Oct. 31, 2007

(65) Prior Publication Data

US 2009/0089815 A1   Apr. 2, 2009

Related U.S. Application Data

(60) Provisional application No. 60/976,382, filed on Sep. 28, 2007.

(51) Int. Cl.
   *G06F 13/00* (2006.01)

(52) U.S. Cl. ............................. 719/327; 719/321; 718/1

(58) Field of Classification Search .................. 719/327, 719/321; 718/1
See application file for complete search history.

(56) References Cited

U.S. PATENT DOCUMENTS

| | | | |
|---|---|---|---|
| 7,685,401 B2 * | 3/2010 | Sugumar et al. ............... | 711/203 |
| 7,877,639 B2 * | 1/2011 | Hoang et al. .................... | 714/36 |
| 2008/0320561 A1 * | 12/2008 | Suit et al. .......................... | 726/3 |
| 2008/0320583 A1 * | 12/2008 | Sharma et al. ................... | 726/12 |

OTHER PUBLICATIONS

IBM Systems Virtualization, Version 2, Release 1; IBM Corporation Dec. 2005; 16 pages.

* cited by examiner

*Primary Examiner* — Andy Ho
(74) *Attorney, Agent, or Firm* — Osha • Liang LLP (57) ABSTRACT

A method for installing a device driver for a device in a guest domain, that includes obtaining a first device driver for the device by a hypervisor, installing, by the hypervisor, the first device driver into memory allocated to the guest domain, and notifying an operating system in the guest domain of the first device driver after installing the device driver, wherein the operating system communicates with the device using the first device driver.

20 Claims, 4 Drawing Sheets

METHOD AND SYSTEM FOR PERFORMING I/O OPERATIONS USING A HYPERVISOR

CROSS-REFERENCE TO RELATED APPLICATIONS

This application claims benefit of U.S. Provisional Application Ser. No. 60/976,382 entitled "Method and system for Accessing a Device in a Hypervisor Environment," filed on Sep. 28, 2007 in the name of Olaf Manczak, Christopher A. Vick, and Michael H. Paleczny.

BACKGROUND

Traditional computer systems are designed with applications executing in an environment specified by an operating system. The operating system in turn executes directly on hardware. In order to use devices in the hardware, an operating system installs the device driver. Thus, when applications want to use the device, the operating system uses the device driver to communicate with the device.

Advances in computer science have led to the virtualization of hardware. Specifically, rather than an operating system directly using resources of hardware, the operating system executes in a virtual environment with virtual hardware resources. One such virtual environment is created by the use of hypervisors to create domains, also referred to as virtual machines. Domains provide a mechanism for the containment of software and the separation of software from hardware. For example, the domain may be used to prevent software failures from causing another failure in the system. Thus in virtualized environment, applications execute in an environment created by the operating system which in turn executes on virtual hardware resources provided by a domain.

A hypervisor may be used to manage the execution of the domains, Specifically, hypervisors are used to determine which domains execute and to transfer control of processors and other physical resources between domains. In addition to the domains with applications and operating systems, other domains may include a control domain, which provides a management interface to the hypervisor, and a driver domain, which executes physical device drivers. The control domain is frequently the only driver domain for a computer system with a hypervisor. Specifically, when an operating system in a domain executing an application requires the use of hardware resources, the request may be transferred via a virtual device driver (i.e., a driver for a virtual device, sometimes also called a bridge device) to the control domain which performs the operations necessary to communicate with the device using a physical device driver.

SUMMARY

In general, in one aspect, the invention relates to a method for installing a device driver for a device in a guest domain, that includes obtaining a first device driver for the device by a hypervisor, installing, by the hypervisor, the first device driver into memory allocated to the guest domain, and notifying an operating system in the guest domain of the first device driver after installing the device driver, wherein the operating system communicates with the device using the first device driver.

In general, in one aspect, the invention relates to a computer system that includes a device, a hypervisor, and an operating system installed in a guest domain of the hypervisor. The hypervisor may be configured to obtain a first device driver for the device, install the first device driver into memory allocated to the guest domain, and notify the operating system of the first device driver after installing the device driver, wherein the operating system communicates with the device using the first device driver.

In general, in one aspect, the invention relates to a computer readable medium that includes computer readable program code embodied therein for causing a computer system to obtain a first device driver for a device by a hypervisor, install, by the hypervisor, the first device driver into memory allocated to a guest domain of the hypervisor, and notify an operating system in the guest domain of the first device driver after installing the device driver, wherein the operating system communicates with the device using the first device driver.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for a hypervisor to install device drivers into a guest domain, instantiate the drivers in physical memory owned by the guest domain, and activate the drivers by notifying the guest domain operating system. Specifically, in one or more embodiments of the invention, a hypervisor may install a device driver into a guest domain, instantiate the driver in a location of physical memory allocated to the guest domain, and then notify the operating system in the guest domain of the new device driver so that the operating system may use the device driver. Further, the hypervisor may replace the device driver without the operating system being aware that the replacement has occurred.

Figure 1:
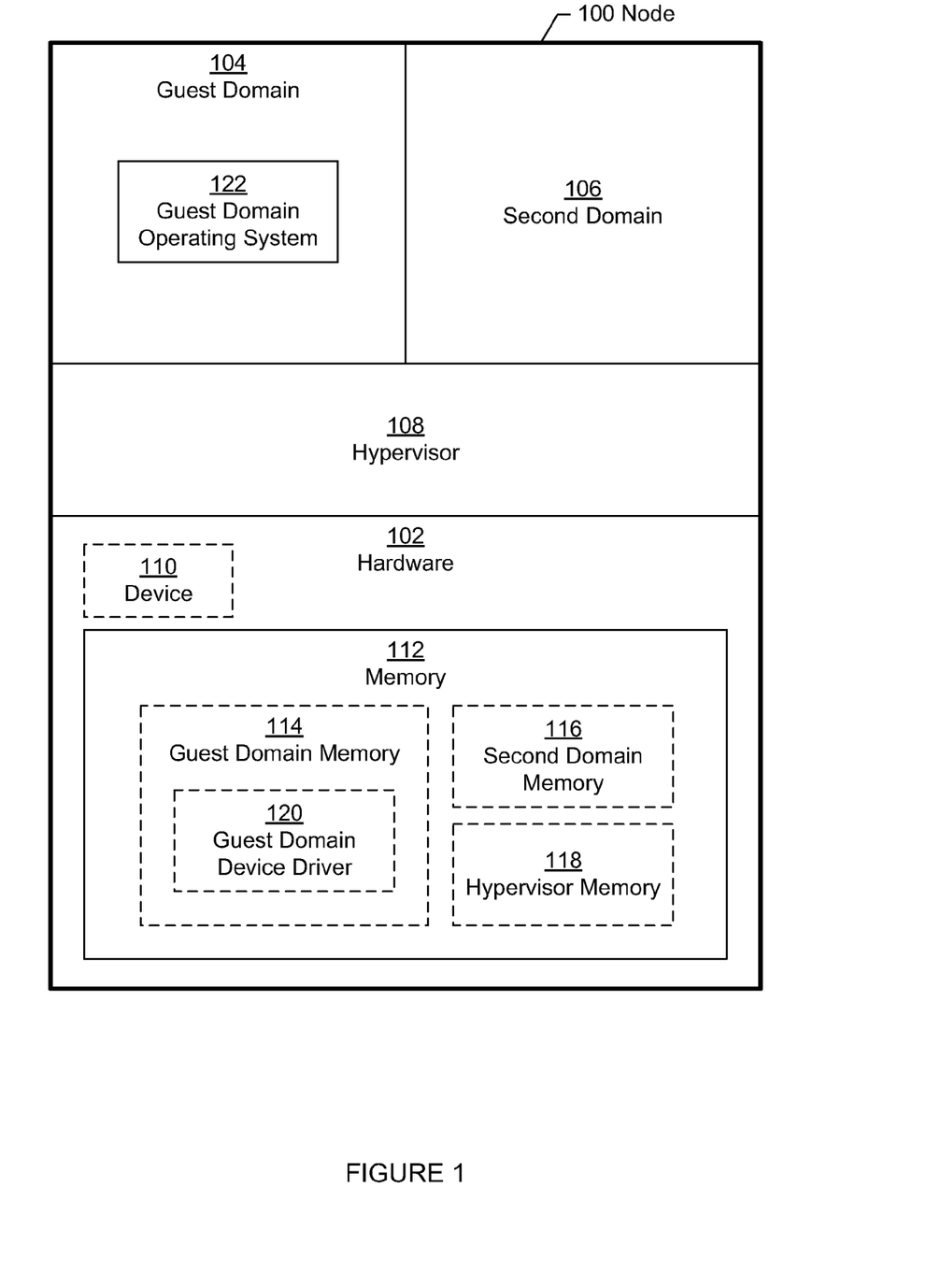
FIG. 1 shows a schematic diagram of a system in accordance with one or more embodiments of the invention.

FIG. 1 shows a schematic diagram of a node (100) in accordance with one or more embodiments of the invention. As shown in FIG. 1, a node (100) includes hardware (102), a guest domain (104), a second domain (106), and a hypervisor (108) in accordance with one or more embodiments of the invention.

The hardware (102) includes the physical devices on a node (100). For example, the hardware may include one or more processors (not shown), memory (112), and at least one device (110). In one or more embodiments of the invention, the node may have a single processor or multiple processors. Further, each processor on the node may be a multi-core processor in accordance with one or more embodiments of the invention. Additionally, the node may be a part of a distributed computer system having multiple nodes.

In one or more embodiments of the invention, the hardware includes one or more devices (110). Devices (110) on the node may include internal devices and/or peripheral devices. For example, the devices (110) may include input and output devices, such as storage drives, monitors, printers, networking devices, sound devices, video based devices, keyboard, mouse, or any other type of device that may be used with a computer system.

The hardware (102) includes memory (112) in accordance with one or more embodiments of the invention. Memory (112) includes any type of storage medium used to store data. In one or more embodiments of the invention, memory (112) may be allocated to different components of the node (100). The allocation of memory (112) is discussed in more detail below.

In one or more embodiments of the invention, software executes on the hardware (102) of the node (100). The software includes a guest domain (104), a second domain (106), and a hypervisor (108). A guest domain (104) and a second domain (106) are partitions of the resources available on the node (100). The partitioning of resources may be in terms of space (e.g., memory), time and space (e.g., processor or micro-core of a processor), or time. A domain is a type of virtual machine within which a program may execute. Specifically, domains provide a method for containment of software and a separation of software from hardware. For example, domains may be used to prevent software failures in a single domain from causing another failure in the system. Each domain may be allocated disjoint or non-overlapping physical memory. Specifically, the guest domain (104) may be allocated guest domain memory (114) and the second domain may be allocated second domain memory (116). The allocation of memory to each domain (e.g., guest domain (104), second domain (106)) ensures that each domain may operate independently.

A guest domain (104) is a type of domain with access limited to virtual resources. A virtual resource is a layer of indirection that represents the physical resources, such as the hardware, of the node. Specifically, in one or more embodiments of the invention, programs in the guest domain (104) perform functions that are wholly contained in the guest domain (104). For example, programs in the guest domain (104) may be unable to directly control hardware (102), access memory of other domains (e.g., second domain memory (116)), or manage the execution of all applications, including on other domains (e.g., second domain (106)).

The guest domain (104) includes a guest domain operating system (122). The guest domain operating system (122) includes functionality to manage the execution of processes in the guest domain (104). In one or more embodiments of the invention, the guest domain operating system (122) operates as if it has sole control of the hardware (102). Specifically, the guest domain operating system (122) operates as if the guest domain operating system (122) is the only operating system on the node (100) and the resources (e.g., processor cycles, guest domain memory (114)) allocated to the guest domain (104) are the only resources available on the node (100). Thus, the guest domain operating system (122) includes functionality to control the operating environment of the processes executing in the guest domain (104).

In addition to a guest domain (104), the node (100) may also include a second domain (106). In one or more embodiments of the invention, the second domain (106) is configured to separately execute programs. For example, the programs executed by the second domain (106) may include one or more user-level applications, management programs, an operating system, etc. The operating system of the second domain may be the same as the guest domain operating system or may be a different operating system. Specifically, the second domain operating system may provide a different execution environment than the guest domain operating system (122).

The second domain (106) may be a control domain, a driver domain, or a second guest domain. In one or more embodiments of the invention, when the second domain is a control domain, the second domain executes software to perform system management tasks associated with a node having a hypervisor (108) (described below). Specifically, the second domain software may include functionality to configure the hypervisor (108), perform communications with a physical device (110) for other domains (e.g., guest domain (102)), create, destroy, and configure guest and driver domains, and functionality to perform the management of the node (100). While FIG. 1 shows a node (100) with only two domains, one skilled in the art will appreciate that the node (100) may have a single domain or more than two domains.

Continuing with FIG. 1, the hypervisor (108) includes functionality to control the sharing of hardware resources on the node (100). In one or more embodiments of the invention, a hypervisor (108) is a software component that has separate memory (e.g., hypervisor memory (118)) from the domains (e.g., guest domain (104), second domain (106)). Specifically, the hypervisor (108) includes functionality to virtualize the hardware (102) of the node (100) so that more than one operating system may run on the node (100) concurrently.

In one or more embodiments of the invention, the hypervisor (108) includes functionality to monitor the use of the device (110) by the node (100) and install a device driver (e.g., guest domain device driver (120)) into the guest domain memory (114). The hypervisor (108) further includes functionality to store identification of the location of the guest domain device driver (120) in the guest domain memory (114). Thus, in one or more embodiments of the invention, the hypervisor may replace the guest domain device driver (120) without additional notification of the guest domain operating system (122).

In one or more embodiments of the invention, the guest domain device driver (120) allows the guest domain (104) to request the use of the device (110). Specifically, a guest domain device driver (120) is an intermediary between the device (110) and the guest domain operating system (122).

In one or more embodiments of the invention, the guest domain device driver (120) may be a device driver for a virtual device or a paravirtualized device. A device driver for a virtual device may appear to the guest domain operating system (122) as if it is a device driver for a physical device, but it does not allow direct communication with the device (110). Specifically, when a device driver for a virtual device is used, data is copied by the hypervisor between the memory of the guest domain and memory of the second domain. The second domain uses a physical device driver to communicate with the device to perform the functions requested by the guest domain operating system (122). Thus, to the guest domain operating system (122), the virtual device has the appearance of a physical device even though data transfer has a level of indirection.

In contrast, a device driver for a paravirtualized device allows the guest domain to communicate directly with the physical device without the interference of another domain. Specifically, data is transmitted by the physical device accessing the same memory buffer as the guest domain. The device driver for the paravirtualized device issues commands to the hypervisor, which in turn issues commands to the physical device. In one or more embodiments of the invention, the device driver for the paravirtualized device is hardware-dependent and operating system specific. Specifically, the device driver for the paravirtualized device is dependent on the type of device and is able to handle the system calls that are specific to the type of operating system.

In order to install the guest domain device driver (120), the hypervisor (108) may include functionality to access a device driver generator (not shown) and/or a device driver repository (not shown). Specifically, the device driver generator and/or the device driver repository may be a part of the hypervisor or accessible by the hypervisor. In one or more embodiments of the invention, a device driver generator includes functionality to generate a device driver based on information about the operating system and information about the device. A device driver generator may include functionality to access a repository of application programming interfaces supported by the operating system and a repository of commands that can be interpreted by the device.

In one or more embodiments of the invention, a device driver repository is a storage area for storing device drivers. A device driver for each combination of types of devices and types operating systems that may be used by the node (100) may be stored in the device driver repository.

While FIG. 1 shows one or more embodiments of the invention in which the hypervisor (108) executes directly on the hardware (102), the hypervisor (108) may alternatively execute on a host operating system without departing from the scope of the invention. In one or more embodiments of the invention, the host operating system may exist in a layer between the hypervisor (108) and the hardware (102). For example, the host operating system may be used to support more types of hardware.

Figure 2:
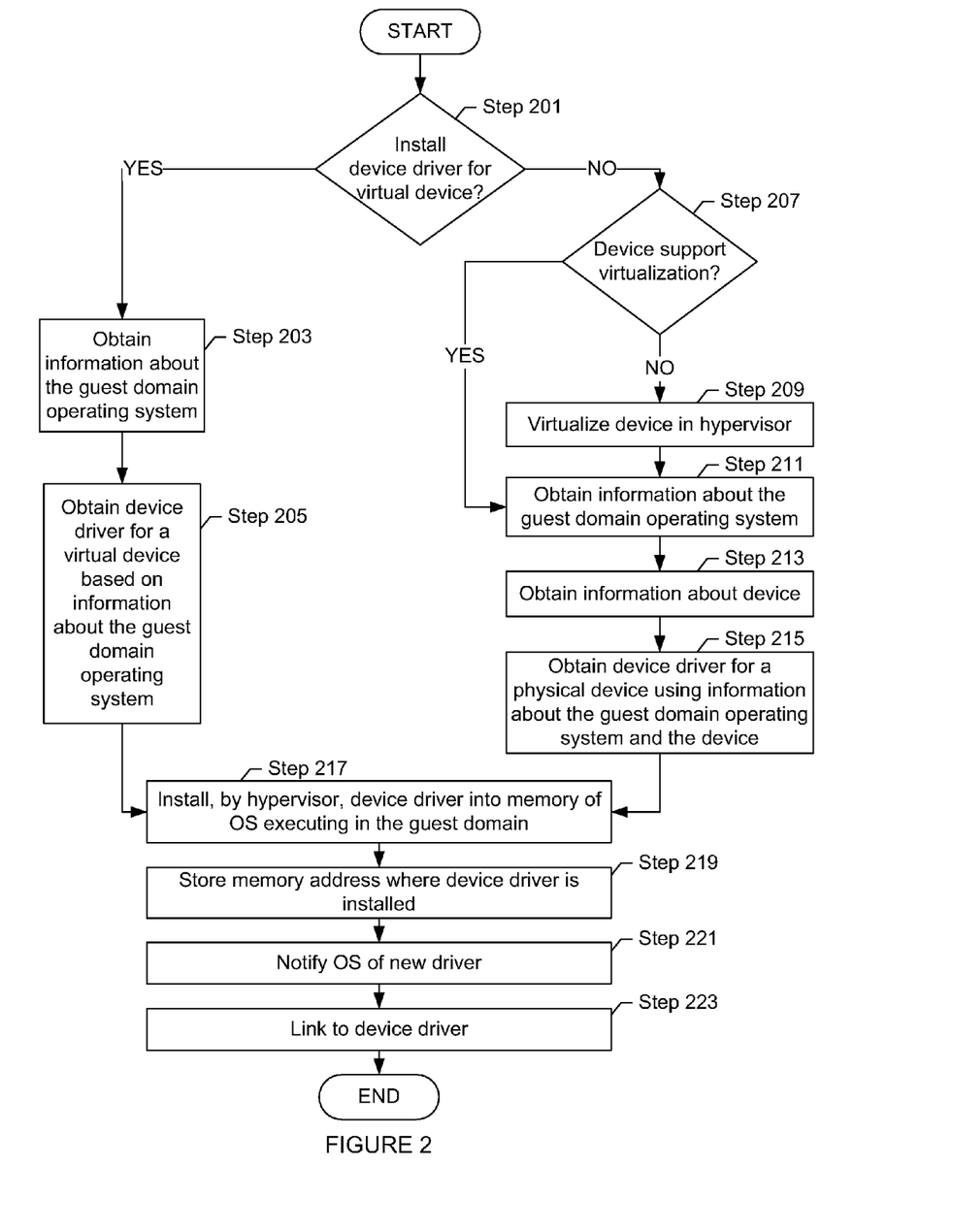
FIGS. 2-3 shows flowcharts of a method in accordance with one or more embodiments of the invention.
Figure 3:
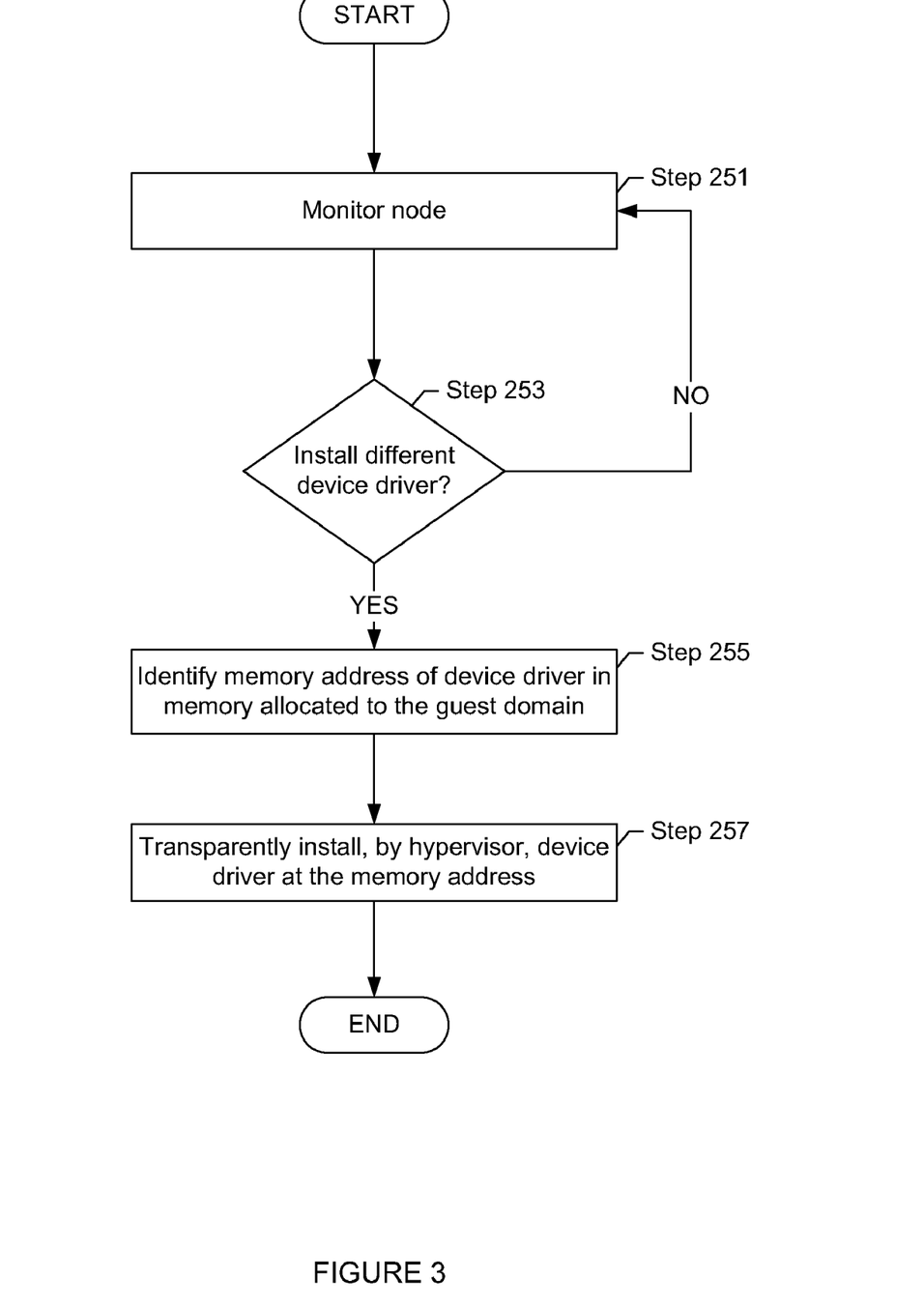

FIGS. 2-3 show flowcharts of methods in accordance with one or more embodiments of the invention. While the various steps in these flowcharts are presented and described sequentially, one of ordinary skill will appreciate that some or all of the steps may be executed in different orders, some or all of the steps may be combined and/or omitted, and some or all of the steps may be executed in parallel.

FIG. 2 shows a flowchart of a method for installing a device driver by the hypervisor in the guest domain in accordance with one or more embodiments of the invention. Initially, a determination is made whether to install a device driver for a virtual device or a device driver for a paravirtualized device in the guest domain (Step 201). The determination of which device driver to install may be based on the use of the physical device and/or the configuration of the node. For example, if only a single guest domain is using the physical device, then a device driver for a paravirtualized device may be installed in the guest domain. However, if multiple domains are using the physical device, and the physical device does not support virtualization, a device driver for a virtual device may be installed. Further, if the second domain is a control or driver domain and the control or driver domain is used to prevent hardware failure, a device driver for a virtual device may be installed to ensure that when the guest domain operating system communicates with the device, the communication is performed via the control or driver domain.

If a device driver for a virtual device is to be installed, information about the guest domain operating system is obtained (Step 203). The information about the guest domain operating system may include the type of operating system, the version of the operating system, updates to the operating system that have been installed, etc. Different methods may be used to obtain information about the guest domain operating system. In one or more embodiments of the invention, the information may be stored in memory allocated to the control domain or the hypervisor when the guest domain operating system is installed thus allowing the information to be obtained directly from the memory of the control domain or memory of the hypervisor.

In one or more embodiments of the invention, the guest domain operating system supports a custom application programming interface that allows the hypervisor to communicate with the guest domain operating system. The hypervisor may use this application programming interface to request the information from the guest domain operating system. One skilled in the art will appreciate that any suitable method may be used to obtain the information about the guest domain operating system without departing from the scope of the invention.

Regardless of how the information is obtained, a device driver for a virtual device is obtained based on the information about the guest domain operating system (Step 207). Specifically, in one or more embodiments of the invention, the device driver for a virtual device may be obtained from a device driver repository. Further, in one or more embodiments of the invention, the device driver for a virtual device may be generated by a device driver generator. Generating a device driver may be performed using any suitable technique known in the art for automatic software generation. For example, the device driver for a virtual device may be generated to receive system calls created by the guest domain operating system and forward the system calls to the appropriate routine in the hypervisor.

Continuing with FIG. 2, rather than installing a device driver for a virtual device, the determination may be made in Step 201 to install a device driver for a paravirtualized device. If a determination is made to install a device driver for a paravirtualized device, then a determination is made whether the physical device supports virtualization (Step 207). In one or more embodiments of the invention, a physical device supports virtualization when the physical device may simultaneously communicate with more than one guest domain. For example, one type of physical device that supports virtualization is a network card that provides a network input/output interface and provides multiple independent connections. Further, in one or more embodiments of the invention, a physical device that supports virtualization may have separate hardware queues that each may be assigned to distinct guest domain operating systems. Thus, the guest domain operating systems may communicate with the physical device without interfering with each other.

If the physical device does not support virtualization, the hypervisor may virtualize the physical device in accordance with one or more embodiments of the invention (Step 209). Virtualizing the physical device may include, for example, creating buffers for each guest domain. When executing, each guest domain may insert data into the buffer assigned to the guest domain. Then, the hypervisor may interleave the buffers and dispatch the data to the physical device during execution.

Continuing with FIG. 2, in one or more embodiments of the invention, information about the guest domain operating system is obtained (Step 211). Obtaining information about the guest domain operating system may be performed, for example, as described above in Step 203. Further, information about the physical device is obtained (Step 213). The information about the physical device may include information about the commands that that the physical device supports or information about the type of physical device.

Using the information about the guest domain operating system and information about the physical device, a device driver for a paravirtualized device is obtained (Step 215). In one or more embodiments of the invention, the device driver for a paravirtualized device may be obtained from a vendor of the physical device, obtained from a device driver repository, and/or generated as described above. For example, a known device interface that is published by a vendor of a physical device may be obtained. Further, the system calls for the type of guest domain operating system may be identified. Next, a device driver for a paravirtualized device may be generated to receive the system calls based on the type of operating system.

Regardless of whether the device driver is a device driver for a virtual device or a device driver for a paravirtualized device, the device driver is installed into the memory of the guest domain operating system (Step 217). In one or more embodiments of the invention, installing the device driver may be performed by copying files into the guest domain.

Further, the device driver is instantiated into the physical memory owned by the guest domain (Step 219). Specifically, the hypervisor may load the device driver into a memory buffer owned by the guest domain operating system.

Continuing with FIG. 2, after installing the device driver, the hypervisor notifies the guest domain operating system that the new device driver is available (Step 221). In one or more embodiments of the invention, this notification may be operating system dependent. Notifying the guest domain operating system may be performed, for example, by accessing a registry, updating a table, notifying a device manager in the guest domain operating system, using a custom application programming interface in the guest domain operating system, etc. In one or more embodiments of the invention, notifying the guest domain operating system may include specifying the corresponding entry point or operation that the guest domain operating system is to perform when a specific system call for the device driver is requested.

Further, in one or more embodiments of the invention, the memory address where the device driver is installed is stored by the hypervisor (Step 223). Specifically, the hypervisor tracks the address where the device driver is installed. Further, the hypervisor may also store the corresponding entry point or operation that the guest domain operating system is to perform when a specific system call for the device driver is requested. Thus, if the device driver is later replaced, the device driver can be replaced without affecting the guest domain operating system.

After the notification, the guest domain operating system performs any required linking to the device driver in order to be able to use the device driver. In one or more embodiments of the invention, the guest domain operating system may update registries or perform any other operation necessary to allow applications to access the device driver.

Once the guest domain is notified of the device driver, the guest domain operating system may use the device driver to communicate with the device. If the device driver is a device driver for a paravirtualized device, the guest domain may communicate with the device by calling a routine in the device driver for a paravirtualized device. The routine of the device driver for a paravirtualized device may create a command and send the command to the device. For example, the device driver for a paravirtualized device may insert data into a queue or hardware buffer for the device that is allocated to the guest domain. The hypervisor, for example, may dispatch data in the queue or hardware buffer to the device. When results are received, the device driver for a paravirtualized device may receive results, create an interrupt, and forward the results to the operating system of the guest domain.

If the device driver is a device driver for a virtual device, the communication with the device may be transparently handled by the hypervisor and/or the control domain. For example, during execution of an application in the guest domain, the application may request I/O operations with a device. The request may be sent via a system call to the guest domain operating system that uses the device driver for a virtual device.

In one or more embodiments of the invention, the guest domain operating system may not be able to distinguish between the device driver for a virtual device and the device driver for a paravirtualized device. Specifically, the guest domain operating system calls the same routine in the device driver for a virtual device that the guest domain operating system would call in the device driver for a paravirtualized device. In response, the device driver for a virtual device calls a routine in the hypervisor. When the hypervisor next executes, the hypervisor performs a system call to the control domain in one or more embodiments of the invention. When the control domain executes, the control domain may use a device driver for a paravirtualized device to request the operation from the device. The results of the request may be similarly propagated back to the application domain.

FIG. 3 shows a flowchart of a method for updating the device driver based on the use of the device in accordance with one or more embodiments of the invention. During execution, the node is monitored (Step 251). Based on the monitoring, a determination may be made whether to install a different device driver (Step 253). For example, if a second guest domain is added or removed from the node that shares the device driver, then a determination may be made to install a different device driver. In another example, if a physical device fails, and another suitable physical device is available on the same node, the hypervisor may replace the device driver for the failed physical device with a device driver for the suitable physical device. In another example, usage of the device may result in a need for a different driver. For example, if a high performance application is executing in the guest domain, a determination may be made to install a device driver for a paravirtualized device into the memory of the guest domain in order to provide greater performance. Specifically, greater performance may be provided because the guest domain operating system may communicate directly with the device rather than waiting on the control domain to execute or performing a two-step process of requiring the host operating system to use a device driver for a paravirtualized device.

If a determination is made to install a different device driver, the memory address where the current device driver is installed in the memory allocated to the guest operating system is identified (Step 255). Specifically, because the hypervisor installed the current device driver in the memory allocated to the guest operating system and the guest operating system cannot change the location of the device driver, the hypervisor can identify where the hypervisor installed the current device driver. Additionally, the hypervisor may also identify the entry points or routines to access the current device driver from the guest domain operating system.

Prior to installing the device driver, the hypervisor may determine whether the guest domain operating system is in the process of communicating data with the device. Since the device is a virtual device or a paravirtualized device, communication is performed through the hypervisor. Specifically, the hypervisor can track all communications between the guest domain and the device. Thus, if the guest domain operating system is in the process of communicating data with the device, the hypervisor may perform appropriate operations (e.g., halt communication, wait until the communication is complete, store the current state of communication, etc.) so as to not interrupt the communication.

The hypervisor then transparently installs the new device driver at the memory address (Step 257). For example, the hypervisor may replace the current device driver with the new device driver. Alternatively, installing the new device driver may include only reconfiguring the device driver so as to be a device driver for a paravirtualized device or for a virtual device. For example, the hypervisor may install the new device driver by unpacking the software components (i.e., files and/or folders) of the new device driver and replacing software components of the old device driver with the software components of the new device driver.

In one or more embodiments of the invention, the replacement is transparent in that the hypervisor does not notify the guest domain operating system. Further, in one or more embodiments of the invention, the guest domain operating system cannot detect that the old device driver is replaced. Specifically, the entry points may remain the same between the different device drivers. Further, in one or more embodiments of the invention, the memory space allocated to the device driver remains the same. Thus, to the guest domain operating system, the new device driver may appear the same as the previous device driver.

Figure 4:
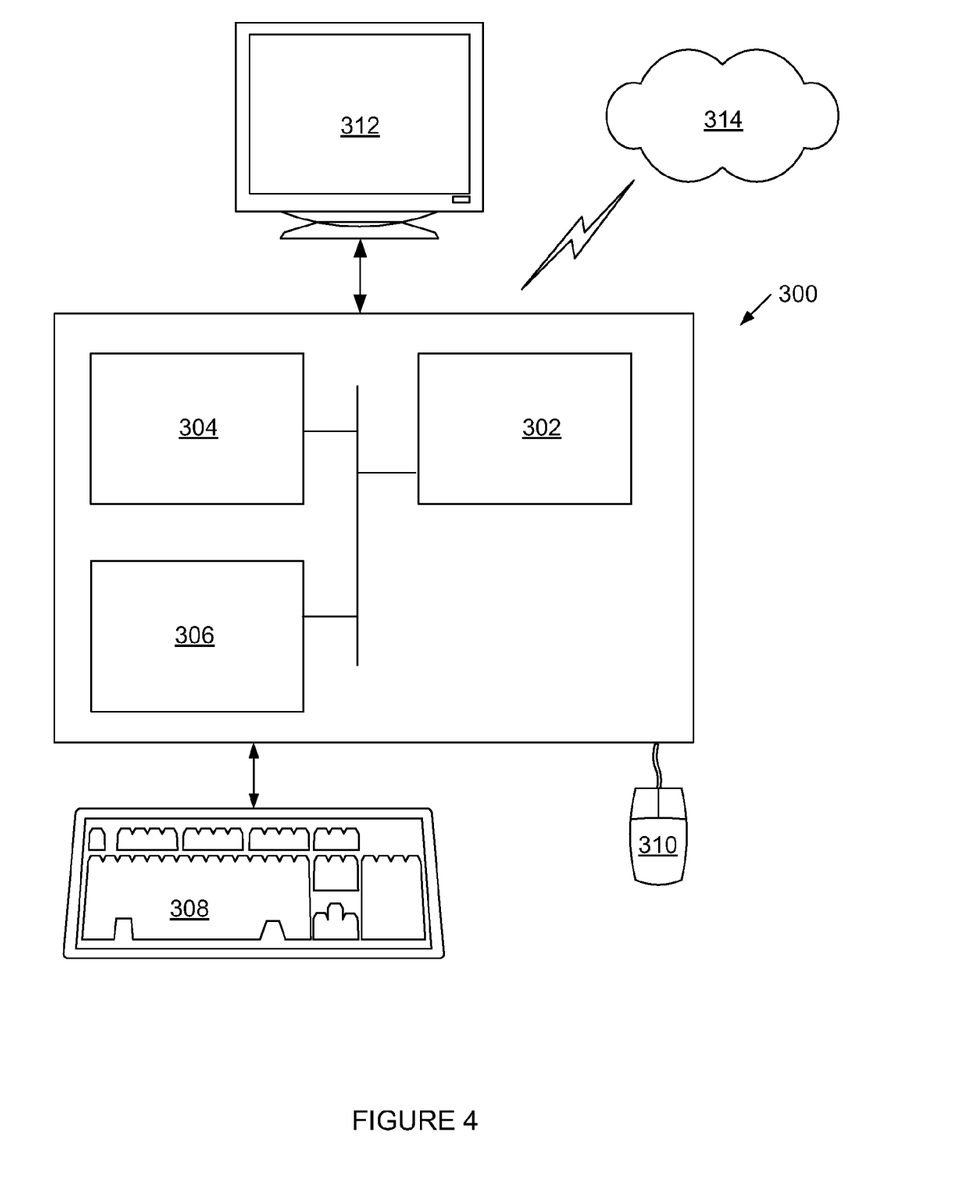
FIG. 4 shows a computer system in accordance with one or more embodiments of the invention.

Embodiments of the invention may be implemented on virtually any type of computer regardless of the platform being used. For example, as shown in FIG. 4, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (314) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., device driver generator, device driver repository, node) may be located on a different node within the distributed system. In one or more embodiments of the invention, the node may be to a computer system. In some embodiments of the invention, the node may be a processor with associated physical memory. The node may also be a processor with shared memory and/or resources in one or more embodiments of the invention. Further, software instructions to perform embodiments of the invention may be stored on a computer readable medium such as a compact disc (CD), a diskette, a tape, a file, or any other computer readable storage device.

Embodiments of the invention provide a mechanism for a hypervisor to control the use of a device while managing the level of performance. For example, the hypervisor can have the option of giving full and direct access to a device to an operating system in a single guest domain. Thus, the guest domain may receive greater performance. Furthermore, when additional domains are added, the hypervisor can replace the device driver with a different device driver that allows the device to be shared. Further, the replacement of the device driver is transparent to the operating system in the guest domain. Thus, the operating system in the guest domain may continue to communicate with the device without interruption.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for installing a device driver for a device in a guest domain, comprising:
   obtaining a first device driver for the device by a hypervisor;
   installing, by the hypervisor, the first device driver into memory allocated to the guest domain; and
   notifying an operating system in the guest domain of the first device driver after installing the device driver,
   wherein the operating system communicates with the device using the first device driver.

2. The method of claim 1, wherein obtaining a first device driver further comprises:
   obtaining information about the operating system;
   obtaining information about the device; and
   generating the first device driver using the information about the operating system and the information about the device.

3. The method of claim 1, wherein obtaining the first device driver further comprises obtaining the first device driver from a repository of device drivers.

4. The method of claim 1, wherein the first device driver is one selected from a group consisting of a device driver for a virtual device and a device driver for a paravirtualized device.

5. The method of claim 1, further comprising:
   replacing the first device driver with a second device driver, wherein the replacement of the first device driver with the second device driver is transparent to the operating system,
   wherein the operating system communicates with the device using the second device driver.

6. The method of claim 5, further comprising:
   monitoring, by the hypervisor, use of the device by the operating system to determine when to replace the first device driver with the second device driver.

7. The method of claim 6, wherein the first device driver is a device driver for a virtual device and the second device driver is a device driver for a paravirtualized device, and wherein the first device driver is replaced with the second device driver when only the guest domain is using the device.

8. The method of claim 1, wherein the operating system communicates with the device by loading data into a buffer associated with the device, and wherein the data is dispatched, by the hypervisor, from the buffer to the device.

9. The method of claim 1, wherein the device is configured for concurrent use by the guest domain and a second domain.

10. The method of claim 1, further comprising:
    inserting, by the operating system, data from the guest domain into a first queue;
    inserting data from a second domain into a second queue; and
    dispatching, by the hypervisor, data from the first queue and the second queue to the device.

11. A computer system comprising:
    a device;
    a hypervisor; and an operating system installed in a guest domain of the hypervisor, wherein the hypervisor is configured to:
  obtain a first device driver for the device;
  install the first device driver into memory allocated to the guest domain; and
  notify the operating system of the first device driver after installing the device driver,
wherein the operating system communicates with the device using the first device driver.

12. The computer system of claim 11, wherein the hypervisor is further configured to obtain the first device driver by:
  obtaining information about the operating system;
  obtaining information about the device; and
  generating the first device driver using the information about the operating system and the information about the device.

13. The computer system of claim 11, wherein the hypervisor is further configured to obtain the first device driver from a repository of device drivers.

14. The computer system of claim 11, wherein the first device driver is one selected from a group consisting of a device driver for a virtual device and a device driver for a paravirtualized device.

15. The computer system of claim 11, wherein the hypervisor is further configured to:
  replace the first device driver with a second device driver, wherein the replacement of the first device driver with the second device driver is transparent to the operating system,
  wherein the operating system communicates with the device using the second device driver.

16. The computer system of claim 15, wherein the hypervisor is further configured to:
  monitor use of the device by the operating system to determine when to replace the first device driver with the second device driver.

17. The computer system of claim 16, wherein the first device driver is a device driver for a virtual device and the second device driver is a device driver for a paravirtualized device, and wherein the first device driver is replaced with the second device driver when only the guest domain is using the device.

18. The computer system of claim 11, wherein the operating system communicates with the device by loading data into a buffer associated with the device, and wherein the hypervisor is further configured to dispatch the data from the buffer to the device.

19. The computer system of claim 11, wherein the device is configured for simultaneous use by the guest domain and a second domain of the hypervisor.

20. A computer readable medium comprising computer readable program code embodied therein for causing a computer system to:
  obtain a first device driver for a device by a hypervisor;
  install, by the hypervisor, the first device driver into memory allocated to a guest domain of the hypervisor; and
  notify an operating system in the guest domain of the first device driver after installing the device driver,
  wherein the operating system communicates with the device using the first device driver.

* * * * *